United States Patent [19]

Brandt et al.

[11] 4,031,635

[45] June 28, 1977

[54] MANIPULATIVE CHROMOSOMAL MODEL

[76] Inventors: Edward E. Brandt; Margaret K. Brandt, both of 208 Doak Drive, Greeneville, Tenn. 37743

[22] Filed: Aug. 20, 1976

[21] Appl. No.: 716,279

Related U.S. Application Data

[63] Continuation-in-part of Ser. No. 568,024, April 14, 1975, abandoned.

[52] U.S. Cl. ...................................... 35/20; 46/29
[51] Int. Cl.² ........................................ G09B 23/36
[58] Field of Search ................... 35/18 R, 18 A, 20; 40/316; 46/23, 28, 29; 128/DIG. 15; 273/140; 24/204; 428/4, 5, 100

[56] References Cited

UNITED STATES PATENTS

| | | | |
|---|---|---|---|
| 2,765,580 | 10/1956 | Herrschaft | 46/29 X |
| 3,035,689 | 5/1962 | Arnheiter | 46/156 UX |
| 3,063,718 | 11/1962 | Steinkamp | 128/DIG. 15 UX |
| 3,068,600 | 12/1962 | Blanchet | 40/316 |
| 3,088,237 | 5/1963 | Plummer | 40/316 |
| 3,296,714 | 1/1967 | Klotz | 35/20 |
| 3,445,940 | 5/1969 | Dziulak | 35/20 |
| 3,480,012 | 11/1969 | Smithers | 128/DIG. 15 UX |
| 3,773,040 | 11/1973 | Gavrilovich | 128/DIG. 15 UX |
| 3,802,097 | 4/1974 | Gluck | 35/18 A |

FOREIGN PATENTS OR APPLICATIONS

| | | | |
|---|---|---|---|
| 1,332,044 | 6/1963 | France | 46/29 |
| 1,277,731 | 6/1972 | United Kingdom | 35/18 A |

OTHER PUBLICATIONS

Science Teaching Aids Co., Box 386, Pell Lake, Wisconsin Catalog Rec'd. Oct. 1965, "DNA Models" pp. 16–19.

Primary Examiner—Harland S. Skogquist
Attorney, Agent, or Firm—Martin J. Skinner

[57] ABSTRACT

A teaching aid in the form of manipulative chromosomal models is described. Each chromosomal model contains at least two subunits, each subunit being provided with separable connectors at each end in the form of hook and loop type fasteners. A pair of chromosomal models of contrasting color permits the study of the behavior of the orientations and movements of chromosomal material during the cell reproduction processes of mitosis and meiosis. Simulated centromeres are provided for the further illustration of these biological processes.

6 Claims, 8 Drawing Figures

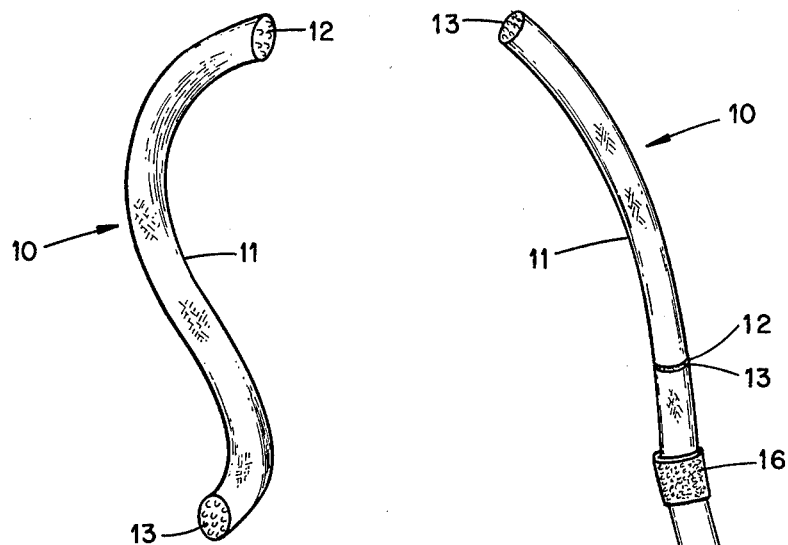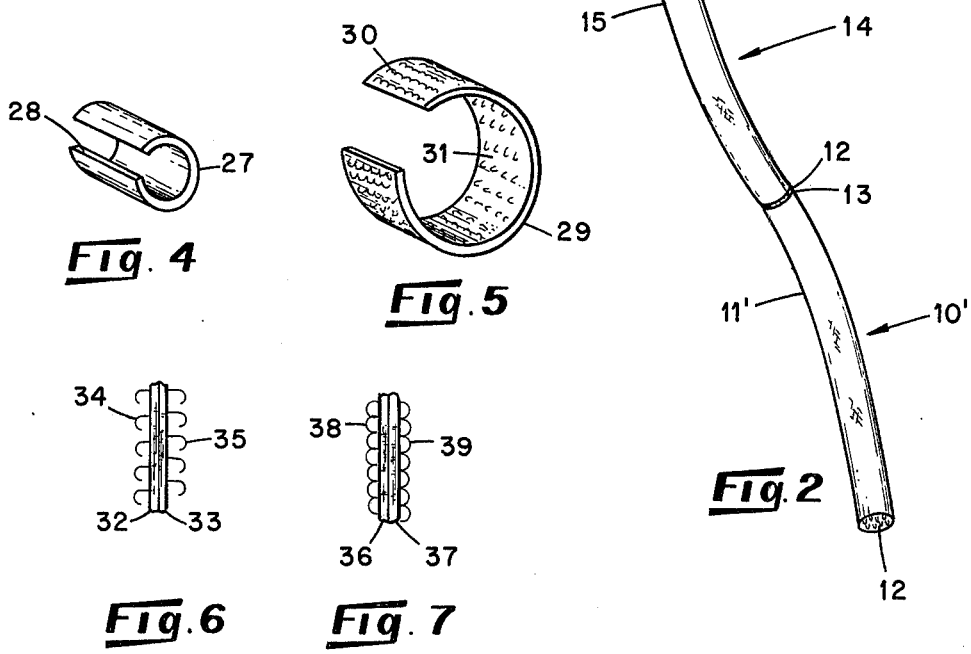

MANIPULATIVE CHROMOSOMAL MODEL

BACKGROUND OF THE INVENTION

This application is a Continuation-in-Part of our patent application for a Manipulative Chromosomal Model, Ser. No. 568,024, filed Apr. 14, 1975, now abandoned.

Students of biological structures and processes usually view the changes occurring in chromosomes using a microscope. While this is an educational tool, it is recognized the learning process may be aided by other visual means and particularly by models that represent the processes being viewed. However, models and other aids useful in teaching cell reproduction are relatively few in number. Static models, whether transparent (U.S. Pat. No 1,478,058) or of plaster, have traditionally served a useful role. Two U.S. Pat. Nos. (1,679,536 issued to H. J. Muller on Aug. 7, 1928, and 2,218,078 issued to J. Assmuth, et al., on Oct. 15, 1940) have been granted for devices whose primary focus has been the dynamic nature of chromosomal movements during anaphase. The recent improvements of photomicrography and particularly time-lapse cinephotomicrography have been productive developments in recent years. The value of photograhy and static visual models in providing a visual representation for students to observe is well established. However, the use of a model would be more effective if it involved the student in a self-learning process by actual manipulation of model chromosomes illustrating the various processes of chromosome changes. It is our object, therefore, to provide a manipulative chromosomal model representing enlarged chromosomes that students see, touch, and move in order to provide a multisensory and dynamic approach to biological studies.

BRIEF DESCRIPTION OF THE DRAWINGS

FIG. 1 is a drawing of a single subunit of a model chromosome;

FIG. 2 is a drawing illustrating three subunits assembled to represent a chromosome;

FIG. 4 is a drawing of a model centromere for encircling a chromosome or a duplicated chromosome;

FIG. 5 is a drawing of another embodiment of a model centromere;

FIG. 6 is a drawing of one type of connector unit used for certain assemblage of model chromosome subunits;

FIG. 7 is a drawing of a second type of connector; and

SUMMARY OF THE INVENTION

Figure 3:
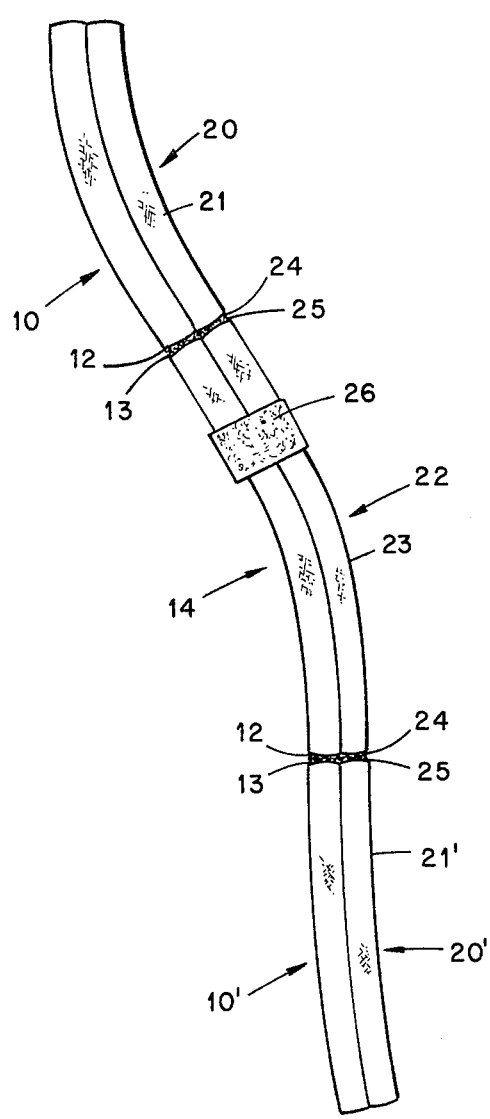
FIG. 3 is a drawing illustrating duplicated chromosomes.

Our invention is a teaching aid that is designed to enable students, through a visual-tactile-motor exposure, to understand the behavior of the orientations and movements of chromosomal material during the cell reproduction processes of mitosis and meiosis. This teaching aid comprises a plurality of limp lengths of rope or like substance of a size suitable for hand manipulation that represent chromosome segments, each length having one-half of a contact sensitive reusable fastener at one end oriented perpendicularly to the general axis of the rope, and a mating half of the contact sensitive fastener at the second end similarly orientated. The aid also includes elements that simulate centromeres that may be used to encircle one or more of the simulated chromosome segments. Typically the teaching aid will contain sufficient chromosome segments to produce four chromosomes each having 2–4 segments and four simulated centromeres. For identification purposes two chromosomes are of one color (e.g., pink) and two of a contrasting color (e.g., blue). Simulated centromeres are a third color (e.g., black).

DETAILED DESCRIPTION

As discussed above, it is highly desirable that a student (for example) have an opportunity to physically manipulate a model of chromosomes in order to better understand various chromosomal events, such as mitosis and meiosis. Mitosis occurs in somatic tissue as a means for replacing or providing more cells and involves duplication of chromosomes followed by one division thereof. As such, it results in two cells that are genetically identical to the original cell and thus produces a constancy of chromosomal number and composition.

Meiosis occurs in germinal tissue as a means for genetic continuity between generations. It involves duplication of chromosomes followed by two divisions resulting in four haploid cells. This produces a variety of gentically unique compositions.

It is the chromosomal behavior in these events, and not the processes of cytokinesis, spindle formation or membrance regeneration that is to be modeled. However, the centromeres — the point on a chromosome by which it appears to attach to the spindle — need to be modeled in the teaching aid.

Our model, or teaching device, is illustrated in FIGS. 1–8. Referring first to FIG. 1, shown therein is a subunit or segment 10 of a simulated chromosome. This segment has a body 11 formed of a length of cotton rope or the like. The material of construction is only limited by the need to produce a limp, elongated body which will retain a given shape when placed upon a relatively flat surface. The dimensions are not critical except to the extent that a segment is easily manipulated by an individual. Accordingly, a rope of diameter 3/16–5/16 in. (0.5–0.8 cm) and a length of 5–8 in. (13–20 cm) is practical for this purpose. Attached at one end of the body 11, in an orientation substantially perpendicular to the axis of the body, is a circular patch 12 of pile fabric having upstanding loops, such as that of a Velcro self-gripping fastener. The diameter of this patch 12 is substantially the same as the diameter of the body. The second end of the body 11 is provided with a circular patch 13 of fabric having outwardly-extending hooks, such as the matching portion of the Velcro fastener. Patch 13, also having a diameter substantially the same as the diameter of the body 11, also is substantially perpendicular to the axis of the body. It will be recognized that any type of contact-sensitive reusable fastener may be used on the ends of the subunits.

In FIG. 2 is illustrated the formation of a simulated chromosome. In this instance, the simulated chromosome is formed with three segments: two identical segments 10, 10' are as shown in FIG. 1, and one segment 14 is identical in diameter but contains a body 15 of a different length than body 11 (for reasons set forth hereinafter). It may be seen that patch 13 of segment 10' engages patch 12 of segment 14, and patch 13 of segment 14 engages with patch 12 of segment 10, to produce the entire simulated chromosome. Additional segments could be added at either ends, if desired, by attaching to the exposed patch 13 on segment 10 or patch 12 of segment 10'. Due to the limp nature of the bodies 11, 11' and 15, this simulated chromosome may be manipulated into any orientation on a flat surface to correspond to the orientation of a real chromosome as seen on a microscope slide. A simulated centromere 16 is shown encircling one chromosome segment, i.e., segment 15.

Our model is shown in FIG. 3 for illustrating a duplicated chromosome. It may be seen that the chromosome of FIG. 2, having segments 10, 10' and 14 has a second simulated chromosome placed side-by-side made up of segments 20, 20' and 22. Each of the body units 21, 21' and 23 are provided with hook and loop type fastener units 24, 25 like those of 12, 13 of FIGS. 1 and 2 so as to serially connect the simulated chromosome segments. Since both chromosomes are limp, they can be made to retain a relationship as shown when placed upon a flat surface so as to appear like duplicated chromosomes observed on a microscope slide.

Also shown in FIG. 3 is a larger simulated centromere 26 of our model. In the real chromosome the centromere is the point on the chromosome by which it appears to attach to the spindle (the achromatic figure along which chromosomes are distributed). This simulated centromere 26 encircles the simulated chromosome at any desired location. The structure of this simulated centromere is such that it may be moved or removed readily for model manipulation. In addition, it should preferably be a distinct (or contrasting) color from the simulated chromosomes for maximum observation.

Although three segments are used in FIGS. 2 and 3 to make up a simulated chromosome, our model is not limited to that number. For example, as few as two segments will illustrate a chromsome, or a duplicated chromosome. Also, as described more hereinafter, the process of inversion may be illustrated with as few as two segments. Furthermore, these same chromosome processes may be illustrated with more than the three segments: although greater than four may be used, these larger numbers of segments may cause confusion. For this reason we utilize two to four segments for each simulated chromosome.

Two embodiments of simulated centromeres 16, 26 are shown in FIGS. 4 and 5. In FIG. 4 the centromere is simulated by a cylindrical sleeve 27 having a full length slit 28. The sleeve 27 may be fabricated from an elastomer, and have an inner diameter less than the simulated chromosome(s). The length in an axial direction may be, for example, ⅜–½ inch (0.9–1.3 cm). As above, the dimensions are chosen so as to be convenient for manipulation by a user. The embodiment of FIG. 5 is a strip 29 (⅜–½ inch wide, for example) of self-gripping fastening material having a looped surface 30 and a hooked surface 31 for releasible engagement to place about an individual simulated chromosome or a model duplicated chromosome.

In meiosis the chromosomal process is more complex than the simple duplication and substitution. For example, sections of chromosomes separate and become attached to other chromosomes. In order to better represent such events, simulated chromosomes should be produced in identifying colors; for example, pink to represent maternal chromosomes and blue to represent paternal chromosomes. Furthermore, some of the chromosomal processes involve inversion (end for end) of chromosome sections. Accordingly, our simulated model is capable of showing inversion.

Since this inversion of a segment of the simulated chromosome would place a hook-type fastener in contact with another hook-type fastener and/or a loop-type in contact with a loop-type, we provide "polarity" connectors as shown in FIGS. 6 and 7. In FIG. 6, for example, a pair of patches 32, 33, both with projecting hooks 34, 35, are fastened back-to-back. This construction is useful for joining simulated chromosome segments both having loop-type fasteners in juxtaposition. FIG. 7 shows two patches 36, 37 in back-to-back relationship, each having loop-type faces 38, 39. This "polarity" connector is used to join juxtaposed hook-type fasteners on simulated chromosome segments.

Figure 8:
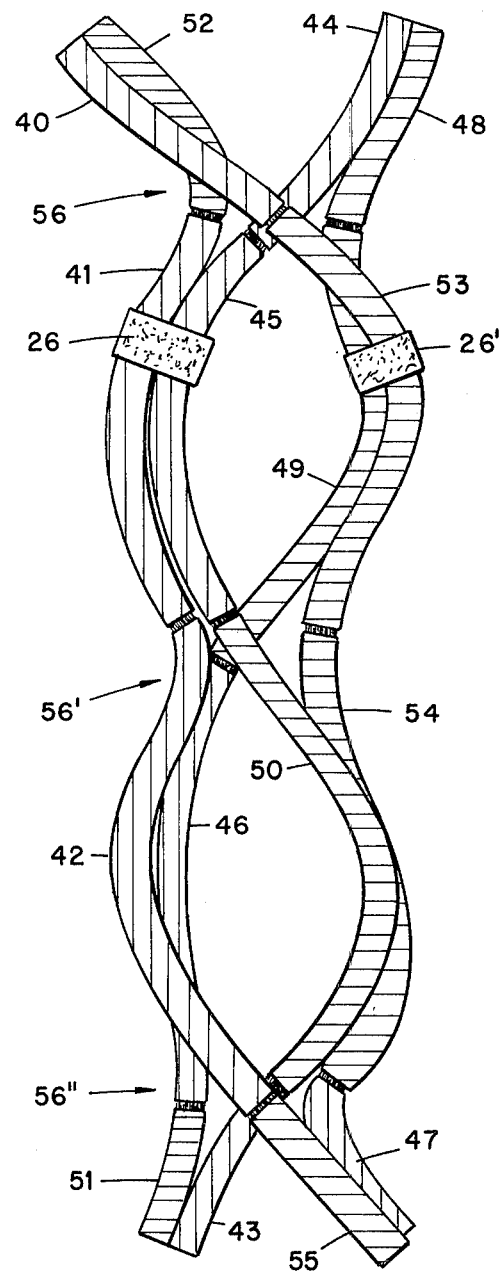
FIG. 8 is a drawing illustrating a complex chromosome rearrangement as depicted with model chromosomes and model centromeres.

FIG. 8 is a drawing illustrating a complex chromosomal manipulation which includes the interlocking of simulated chromosome segments. Four segments are used for each simulated chromosome. In this it may be seen that the use of two lengths of simulated chromosome segment is of value so that a user of the model can best identify the segments that are to be joined. One simulated chromosome is made up of (before breaks and rejoining) segments 40–43, and its duplicated simulated chromosome are segments 44–47. These are shaded as being a pink color. They are encircled by simulated centromere 26. The second duplicated chromosome is made up of segments 48–51 and 52–55. These are shaded as being a blue color, and they are encircled by simulated centromere 26'.

The events that are critical in producing the genetically unique chromosomal compositions of meiosis can be demonstrated with the model of FIG. 8. In very early prophase I of meiosis, the duplicated chromosomes pair up during a process called synapsis. This is easily demonstrated with the model by the user sliding the pair of duplicated chromosomes (like FIG. 3) against each other, point for point along their entire lengths. During this period of close relationship in meiosis breaks randomly occur along the chromosomes. In the model this can be demonstrated by separating the fasteners between two adjoining subunits. Reunion events in meiosis can involve chromosomal strands of different origin. In the model this would be a reunion event of pink to blue or blue to pink. These breakage and reunion events, which are commonly called genetic recombination or crossing-over, form the basis for the ultimate production of haploid cells that are all of different genetic composition.

Following genetic recombination events of meiosis, the duplicated chromosomes repel each other. In the model this is executed by the user sliding the pink model chromosomes from the blue model chromosomes. This repulsion produces x-shaped patterns or chiasmata at the locations where genetic recombination has occurred. The flexible nature of the subunits allows the model to remain in this position until the user desires to exert movement upon the model's centromeres to simulate anaphase movement. The repulsion seen in dipolatene of meiosis is illustrated with the model in FIG. 8. The drawing of the model shows that genetic recombination events resulted in producing three chiasma 56, 56', 56" involving all four of the model's chromosomal strands. The remaining phases of meiosis can easily be demonstrated with the model.

A minimal model to illustrate chromosomal changes requires four simulated chromosomes, each having two segments to provide one site in each chromosome for genetic recombination. Two chromosomal units would be one color, two another. At least four simulated centromeres are needed for this unit.

A more complex model would contain four simulated chromosomes each having two sites for performing simulated genetic recombination. This requires three segments per chromosome. As above, two chromosome units would be one color and two another color. Four simulated centromere units would be required.

A more complex model, such as that illustrated in FIG. 8, requires four segments per simulated chromosome. The number of chromosome units and color combination would be unchanged. Four centromeres would be required; in addition, four "polarity" connectors of each type would be necessary for segment interconnection after inversion of some segments.

While the preferred forms of our invention have been shown and described, it should be understood that suitable additional modifications substitutions and alterations may be made without departing from the invention's major theme.

We claim:

1. A manipulative chromosome model to be placed on a flat surface for the study of chromosomal changes and processes which comprises: from two to four limp generally cylindrical subunits representing chromosome segments, each subunit having a length of about 4 to about 8 inches and a diameter of about ¼ to ⅜ inch; a first half of a contact sensitive reusable fastener affixed to one end of each subunit substantially perpendicular to the length of the subunit; and a second half of the fastener affixed to the second end of each subunit substantially perpendicular to the length of the subunit whereby the subunits may be placed on the flat surface and serially joined to form a simulated chromosome.

2. The manipulative chromosome model of claim 1 wherein the subunits representing chromosome segments are lengths of cotton rope.

3. The manipulative chromosome model of claim 1 further comprising: a second group of limp generally cylindrical subunits representing chromosome segments of an identical number and size, each subunit having a first half of a contact sensitive reusable fastener affixed at one end thereof and a second half of the fastener affixed at the second end, both fasteners halves being substantially perpendicular to the length of the subunit, whereby the subunits may be placed on the flat surface and serially joined to form a second simulated chromosome; and at least one simulated centromere encircling both simulated chromosomes at a common position forming a first duplicated chromosome.

4. The manipulative chromosome model of claim 3 further comprising: additional limp generally cylindrical subunits representing simulated chromosome segments each subunit having a first half of a contact sensitive reusable fastener affixed at one end thereof and a second half of the fastener affixed at the second end, both fastener halves being substantially perpendicular to the length of the subunit, the number of subunits and size being sufficient when joined serially to produce a second duplicated chromosome; and at least a one additional simulated centromere encircling the second duplicated chromosome.

5. The manipulative chromosome model of claim 4 further comprising at least one fastener disc having a first half of a contact sensitive reusable fastener on both surfaces joining two second halves of the fasteners on adjoining simulated chromosome segments and at least one fastener disc having second half of the fasteners on both surfaces joining two first halves of the fasteners on adjoining simulated chromosome segments.

6. The manipulative chromosome model of claim 4 wherein the first simulated duplicated chromosome is one identifying color, the second simulated duplicated chromosome is a second identifying color and the simulated centromere is a third color.

* * * * *